United States Patent
Cambou et al.

(10) Patent No.: US 10,503,890 B2
(45) Date of Patent: Dec. 10, 2019

(54) AUTHENTICATION OF IMAGES EXTRACTED FROM UNCLONABLE OBJECTS

(71) Applicant: Arizona Board of Regents on Behalf of Northern Arizona University, Flagstaff, AZ (US)

(72) Inventors: Bertrand Cambou, Flagstaff, AZ (US); Abolfazl Razi, Flagstaff, AZ (US)

(73) Assignee: ARIZONA BOARD OF REGENTS ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 247 days.

(21) Appl. No.: 15/434,976

(22) Filed: Feb. 16, 2017

(65) Prior Publication Data

US 2017/0235938 A1  Aug. 17, 2017

Related U.S. Application Data

(60) Provisional application No. 62/295,864, filed on Feb. 16, 2016.

(51) Int. Cl.
| | |
|---|---|
| *G06F 7/04* | (2006.01) |
| *G06F 21/36* | (2013.01) |
| *H04L 9/32* | (2006.01) |
| *H04L 29/06* | (2006.01) |
| *G06Q 20/40* | (2012.01) |
| *G06Q 20/42* | (2012.01) |

(52) U.S. Cl.
CPC ............. *G06F 21/36* (2013.01); *G06Q 20/40* (2013.01); *G06Q 20/42* (2013.01); *H04L 9/3278* (2013.01); *H04L 63/08* (2013.01); *H04L 63/1466* (2013.01)

(58) Field of Classification Search
CPC . G06F 21/36; H04L 63/1466; H04L 63/3278; H04L 63/08; H04L 9/3278; G06Q 20/40; G06Q 20/42
See application file for complete search history.

(56) References Cited

U.S. PATENT DOCUMENTS

| | | | | |
|---|---|---|---|---|
| 8,918,851 | B1 * | 12/2014 | Iannamico | G06F 21/36 726/7 |
| 9,449,217 | B1 * | 9/2016 | Bourlai | G06K 9/00221 |
| 2004/0143737 | A1 * | 7/2004 | Teicher | G06K 7/1095 713/167 |

(Continued)

*Primary Examiner* — Fatoumata Traore
*Assistant Examiner* — Carlton Johnson
(74) *Attorney, Agent, or Firm* — Quarles & Brady LLP

(57) ABSTRACT

An authentication system for a computing environment uses physically unclonable functions (PUFs) to authenticate requests to perform an action in the environment. The system receives, from an imaging device, an image of a physically unclonable object associated with the electronic request. The system then obtains from a computer server operating within the system via an encrypted communication channel, a challenge associated with the object. The system uses extraction parameters encoded within the challenge to transform a portion of the image and produce authentication data representing a response to the challenge. The system extracts, using the extraction parameters, the authentication data from the image and determines whether the challenge and response match and the request is authenticated.

20 Claims, 15 Drawing Sheets

(56) References Cited

U.S. PATENT DOCUMENTS

| | | | |
|---|---|---|---|
| 2011/0096955 A1* | 4/2011 | Voloshynovskiy | G06K 9/00 382/103 |
| 2013/0133086 A1* | 5/2013 | Liberman | G09C 5/00 726/28 |
| 2014/0090032 A1* | 3/2014 | Abuelsaad | H04L 63/0823 726/5 |
| 2015/0020181 A1* | 1/2015 | Iwata | G06F 21/32 726/7 |

* cited by examiner

Original Image : X      Clustered Image : $X^{(w)}$      Reference Market : Y

```
                    Challenge for A:
010001              001              Data A 8bits
Position(3, 2)    Angle(45°)

Challenge for B:
010101              101              Data B 8bits
Position(4, 6)    Angle(270°)

Challenge for C:
100001              000              Data C 8bits
Position(5, 4)    Angle(0°)

Challenge for D:
110110              011              Data D 8bits
Position(7, 7)    Angle(135°)
```

```
                 Total PUF Challenge:
010001001-010101101-100001000-110110011-    32bits
    A           B          C          D     Data stream ABCD
```

US 10,503,890 B2

AUTHENTICATION OF IMAGES EXTRACTED FROM UNCLONABLE OBJECTS

CROSS REFERENCE TO RELATED APPLICATION

This application claims priority to Provisional Application No. 62/295,864 filed on Feb. 16, 2016.

FIELD OF THE INVENTION

The present disclosure relates to implementations of physically unclonable functions (PUFs) and unclonable images for cryptographic and authentication purposes. Specifically, the disclosure describes implementations for processing images of unclonable objects in conjunction with PUFs to encode and decode authentication patterns in the images.

BACKGROUND OF THE INVENTION

Image detection in general is widely used to identify objects, people, and biometric prints. Examples of authentication based on image detection are numerous. As shown in FIG. 1, in a pure image detection based authentication scheme (such as in facial recognition techniques), a captured image of interest is compared with a reference image that is stored in a database. Many processing algorithms exist for determining a match between the captured image and the stored image, all of which involve comparison of the values of all or a subset of the pixels in the two images. As a result, large image files are often exchanged over communication lines between the image capture device and other authentication components. In particular, high-resolution images may include many mega-bits of data, which may cause large transmission delays in bandwidth-limited communication channels. Clever techniques have been developed to reduce the size of the files for the purpose of trusted authentications, such as minutia for finger print; nevertheless, transferring image data files through secure and non-secure communication lines has limited applicability.

Basic image capture authentication is also susceptible to common computer system intrusion (i.e., "hacking") techniques. FIG. 2 illustrates such a concern for a generic system of a merchant authenticating a client. In this example, the authentication module detects the image of an object brought by a client, such as an "unclonable" (described further below) hologram located on a credit card. The image is captured and encrypted. To perform the authentication, the digital image of the object has to be transmitted through the non-secure communication line to a secure server that compares the captured image to the image stored in the database. During this transaction, a malicious party, called "Black Hat," can use a separate image detector to detect the image of the object, and can intercept the encrypted image transmitted from the authentication module to the secure server. Using such "man in the middle" hacking techniques, side channel attacks, or other hacking techniques, the Black Hat can compromise the encryption and perform fraudulent transactions with stolen authentication information.

Unclonability is the property of a physical object or element, or of a digital image or function, to be non-reproducible. This is ensured if the images, or physical elements, are extremely complex and random such that making a copy is impossible. Unclonable images can be produced with natural elements, i.e. DNA, and the use of nanomaterials that are based on extremely small and random elements. A physically unclonable function (PUF), as used herein, is a physical device or function whose output depends upon the device's physical characteristics. The physical characteristics, such as critical dimensions, doping levels of semiconducting layers, particle orientations, and threshold voltages, make the device unique and difficult to duplicate. A PUF may therefore be utilized as a hardware implementation of a one-way function.

PUFs are strengthening the level of security of emerging data security methods. In such systems, PUFs operate as a set of cryptographic primitives useful in authentication procedures. The underlying mechanism of PUF authentication is the creation of a large number of challenge (i.e. input) and response (i.e. output) pairs (called CRPs) that are unique to each PUF device. Once deployed during an authentication cycle, the PUFs are queried with challenges. Authentication is granted when the rate of matching responses is statistically higher than a threshold validation parameter. The present systems and methods implement an authentication architecture that combines the security advantages of image-capturing a physically possessed unclonable token with the security advantages of PUFs to produce PUF images and a PUF image authentication process that overcomes the drawbacks of previous systems described above.

BRIEF DESCRIPTION OF THE DRAWINGS

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION OF PREFERRED EMBODIMENTS

Figure 1:
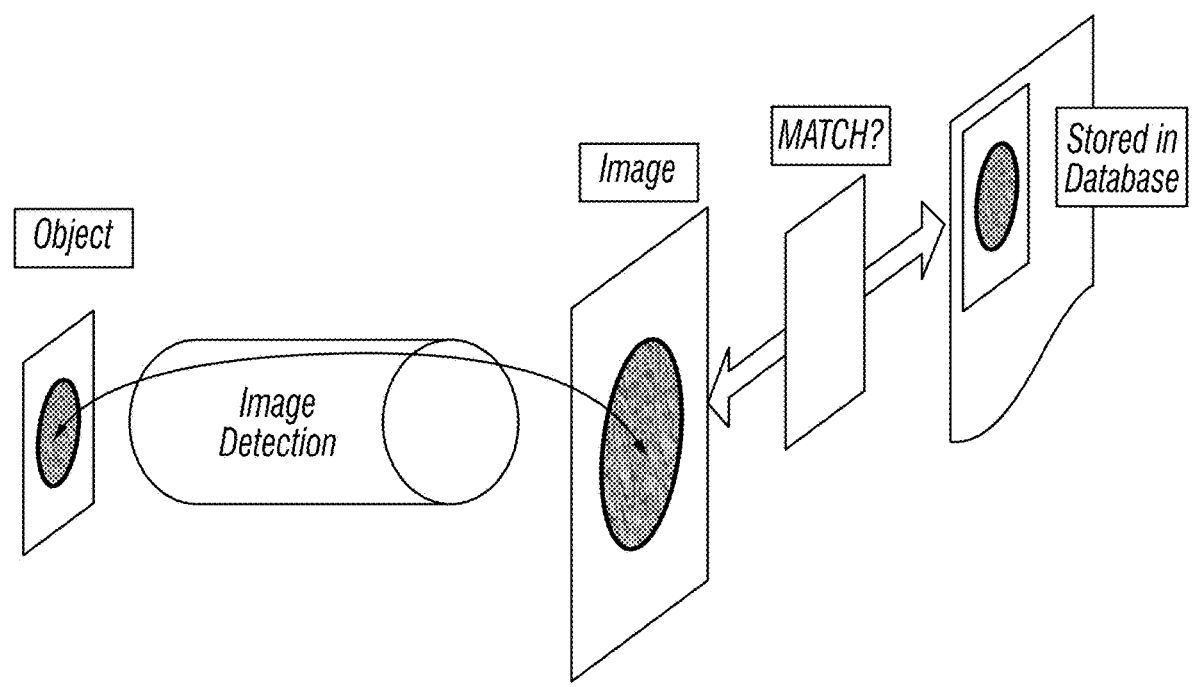
FIG. 1 is a diagram illustrating a prior art basic image detection system for identification of an object.
Figure 2:
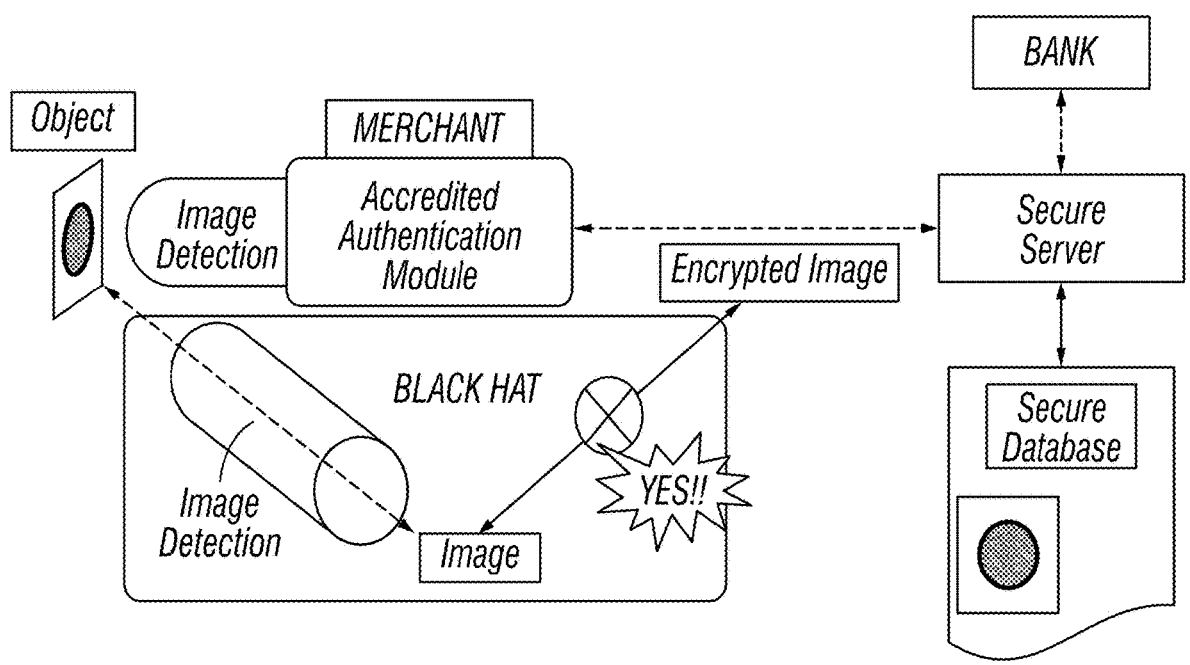
FIG. 2 is a diagram illustrating a prior art basic image detection system for authenticating an object, which is susceptible to Black Hat intrusion.

The present disclosure relates to implementations of an authentication architecture that is based on authentication of a captured image of an unclonable object, where the captured image is authenticated using a physically unclonable function (PUF). The captured image is therefore referred to herein as a "PUF image." The disclosure specifically describes systems and methods that use PUFs to encode and decode the locations within the PUF image that contain the data for generating a valid PUF challenge and response pair ("CRP"). The disclosure assumes the following definitions of important terms.

"Identification," as used herein, is a method to identify a person or an object with a unique identifier. An identification or identifier does not have to be secret. Examples include driving licenses and passports.

"Authentication," as used herein, is a method to verify that a person or an object is the right one (e.g., to grant access to legitimate users). The method has to be secret, reliable, and easy to implement. Authentication keys do not have to be unique and repeated keys are allowed. However, the algorithm response for a given key and session information should be predictable. Examples include secret cryptographic keys, passwords, and pin codes.

"Unclonability," as used herein, is the property of an image, or a physical element, of being non-reproducible. This is ensured if the images, or physical elements, are extremely complex and random such that making a copy is impossible or computationally impractical. Unclonable images can be produced, for example, with natural elements, i.e. DNA, and the use of nanomaterials that are based on extremely small and random elements.

"Location," or to "locate," is the precise position or set of positions of an element of data within a data set (e.g., a pixel in an image), or is a set of instructions necessary to find the locations within the data set, that are exploited to generate challenge and response data streams. This includes parameters such as, but not to be limited to, position, magnification, contrast, luminosity, angle of observation, size of the image to analyze, and the number of bits to generate for the CRPs (described further below).

By leveraging the natural complexity of nanomaterials into random mechanism, it is now possible to have access to unclonable images that are candidates for trusted authentication; PUFs can be generated from these images. Challenges (i.e., reference patterns of the images) can then be stored in a secure server, while responses (i.e., identification patterns) can be generated frequently for authentication. However, after image detection, the unclonable images can enter the digital space, and can be accessible to malicious parties (e.g., a "Black Hat") capable of uncovering the responses. This disclosure describes, among other novel features, systems, and methods, a set of methods to generate PUF responses in such a way that a Black Hat is not able to penetrate the system through illegal authentication, even if it has access to the image of the unclonable object. The methods use a novel architecture that incorporates, as part of the challenge produced by a secure server, instructions to select only a fraction of the image for the purpose of response generation; the selected fraction is composed of locations in the image that are only known by the server. Thereby with these novel methods, the malicious parties cannot extract easily the responses; uncovering where in the image to look with what instructions has been made highly improbable. Such a set of methods can enhance the trustworthiness of known general authentications or, in particular, of authentications based on images extracted from unclonable objects.

Figure 3:
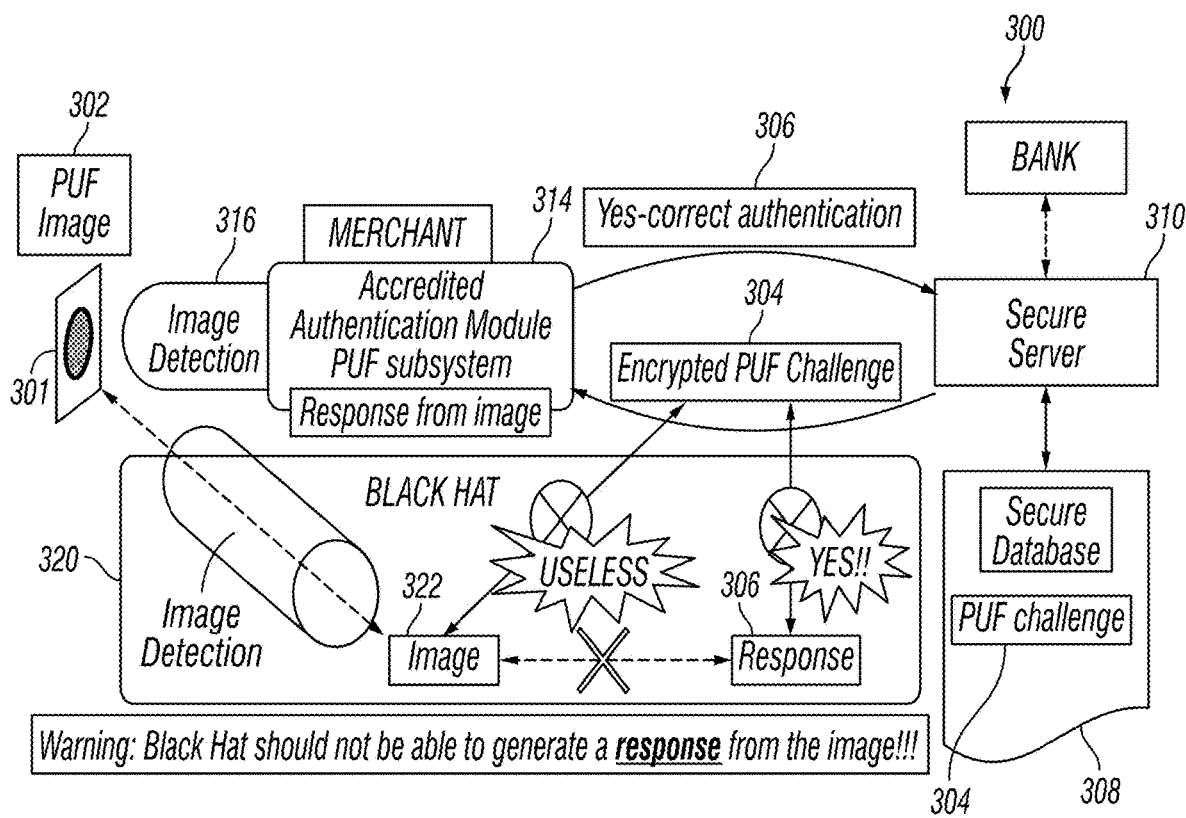
FIG. 3 is a diagram illustrating an exemplary image authentication process protected by a PUF.

An architecture 300 to enhance the overall trustworthiness of an authentication process based on PUF images (i.e., PUFs and unclonable images) is shown in FIG. 3. An unclonable PUF image 302 can be used to generate and/or respond to a PUF challenge 304 (i.e., the reference pattern), which is stored in a secure database 308 accessible by a secure server 310 that communicates over a secure network with an authentication module 314. An imaging device 316 captures the PUF image 302, such as by photographing or otherwise digitally registering an unclonable object 301, and communicates the PUF image 302 securely to the authentication module 314. The authentication module 314 and the secure server 310 then execute the CRP as described below, and the PUF image 302 is authenticated if the authentication module 314 produces the correct PUF response 306 from the PUF image 302. The architecture 300 defeats the Black Hat 320 described above, which also captures an unauthorized PUF image 322 of the unclonable object 301. The unauthorized PUF image 322 may be identical to the PUF image 302, but the Black Hat 320 cannot use it to hack the encryption, provided the Black Hat 320 cannot generate the PUF response 306 from the unauthorized PUF image 322.

The PUF challenge 304, typically 128-bit long, may be heavily encrypted with random numbers or hashing functions to protect the integrity of the system. When the authentication module 314 of the merchant extracts the PUF image 302 of the unclonable function, the authentication module 314 (using, e.g., a PUF subsystem) generates the PUF response 306, which is a fresh pattern representing the image, and compares it with the PUF challenge 304, potentially also sending the PUF response 306 (or a confirmation that the correct PUF response 306 was generated) to the server 310 to complete the authentication. This method is very effective in preventing the Black Hat 320 from hacking the system. Capturing both the unauthorized PUF image 322 of the unclonable object, and intercepting the message containing the encrypted PUF challenge 304 is of little use for Black Hat 320 unless he can find a way to extract on his own the PUF response 306 associated with the authentic PUF image 302.

Considering that with good PUFs, responses and challenges of the same image should be identical, it is important to prevent Black Hat 320 from having access to both the responses, and the encrypted version of the challenge. Therefore, the authentication mechanism should be robust enough to generate a correct response for a given challenge message in the presence of noise, camera calibration and image artifacts so that the legitimate user is identified. On the other hand, it should be secure enough to reject the Black Hat users. It is notable that, in contrast to PIN-based approaches, a new encrypted PUF challenge may be generated by the architecture 300 at each authentication session. Consequently, if the Black Hat 320 eavesdrops the communications link and acquires the message containing the response 306 to the present challenge 304, he cannot use it at subsequent authentication sessions for the same PUF image 302, as can be done with the same PIN.

Figure 4:
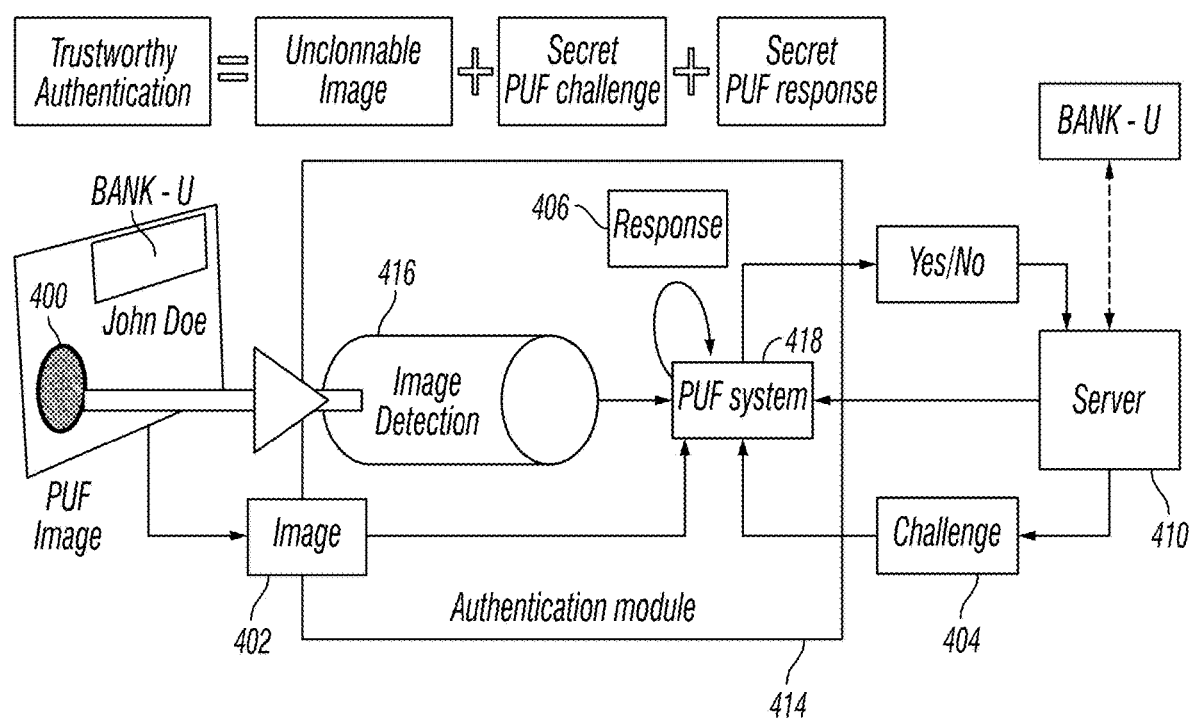
FIG. 4 is a diagram illustrating a data transfer process during authentication in accordance with the present disclosure.

A summary of data exchange during an authentication session is demonstrated in FIG. 4. An authentication module 414 may be a system or service implemented on one or more physical computing devices, such as a payment terminal, point-of-sale device, automated teller machine, and the like. The authentication module 414 may include or be electronically connected to an imaging device 416. In some embodiments, the authentication module 414 may execute specific program instructions to perform one or more authentication methods, including the present PUF authentication method; thus, the authentication module 414 may include a PUF subsystem 418 dedicated to executing the program instructions for the PUF authentication method. The data transfer during authentication includes the following steps: the imaging device 416 captures or receives a clear image 402 of the unclonable object 400, and transfers the image 402 to the authentication module 414; the authentication module 414 generates a fresh PUF response 406 from the image 402; the authentication module 414 receives a PUF challenge 404 from the secure server 410 over the secure network; the authentication module 414 then compares challenge-response-pairs (CRPs) (i.e., the PUF challenge 404 and the PUF response 406), and the transaction is authorized when CRPs are matching within a predetermined degree of certainty (i.e., threshold).

Three conditions are necessary to ensure trust in the authentication process. The first is unclonability of the physical object. The usage of nanomaterials, or complex natural elements such as DNA, are known to be highly unclonable, but other unclonable objects that are compatible with PUF image capture may be used. The second condition is secrecy of the challenge. The system may use sophisticated cryptographic methods to keep the challenge, i.e. reference pattern, secret in the secure database, and to protect the communication between terminal and server. The third condition is impossibility for Black Hat to extract the response from an image of the unclonable object, which objective is described further below.

Figure 5:
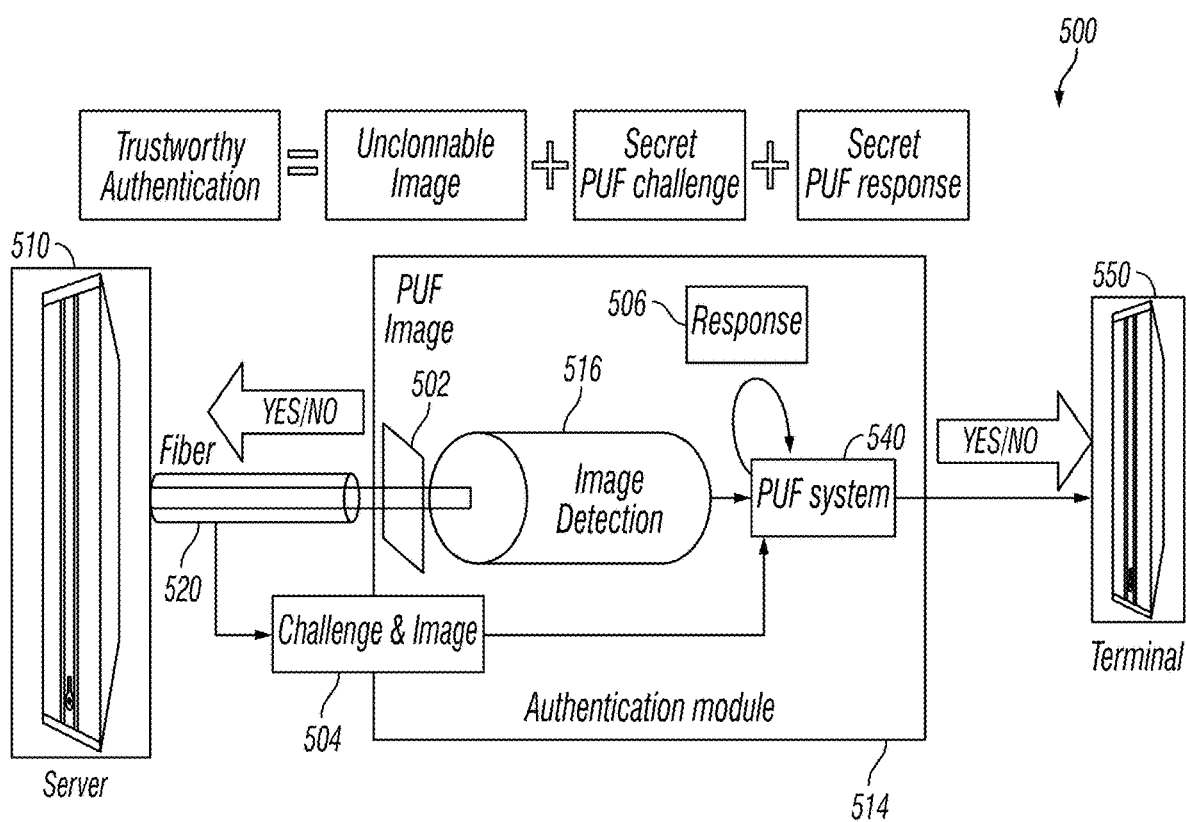
FIG. 5 is a diagram illustrating an exemplary system for securing fiber-optic communication with a PUF.

FIG. 5 illustrates another exemplary system 500 using a PUF image 502 to secure fiber communication with nanomaterial inserted in the fiber-optic cable 520. Transparent PUF samples inserted directly within the fiber-optic cable 520 are covered with complex nanomaterials that selectively block the light. Each sample, when illuminated by data transfer in the cable 520, creates a unique transmitted image that can be captured by the imaging device 516 and exploited as a PUF image 502. In this case, the data transfer around the authentication module 514 is as follows: the server 510 sends a PUF challenge 504 to the authentication module 514 through the cable 520, which transmission illuminates the PUF sample for capture of the PUF image 502; the PUF subsystem 540 receives the PUF image 502 and extracts a fresh PUF response 506 from the captured PUF image 502; the authentication module 514 then compares CRPs, and the transaction with a requesting terminal 550 is authorized when CRPs are matching within a predetermined degree of certainty. The integrity of the system is thereby based on the same conditions: the unclonability of the image, the secrecy of the challenge, and the secrecy of the response.

Figure 6:
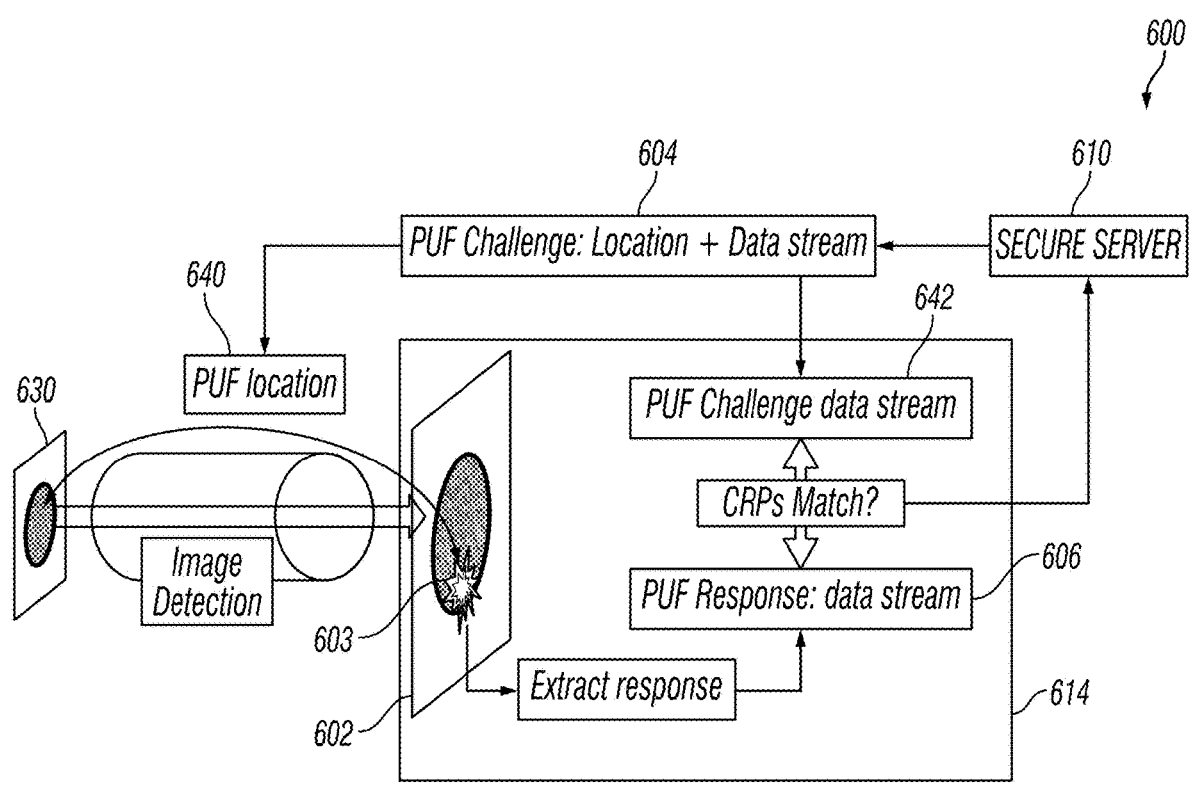
FIG. 6 is a diagram illustrating call-response pairs based on location, in accordance with the present disclosure.

An aim of the proposed methods is to generate responses from the image of an unclonable object that are extremely difficult, if not impossible, to reproduce. FIG. 6 illustrates an exemplary architecture 600 implementing a "location" based challenge-response-pair generation. In particular, the architecture 600 generates PUF challenges 604 that encode a "location" 640 with additional bits of a data stream 642. The "location" 640 in the PUF challenge 604 represents a location 603 within a PUF image 602 that is used to generate a PUF response 606 that authenticates the PUF image 602. The location 603 may be defined by a set of bits allowing the authentication module 614 to find where and how to extract the PUF responses 606 with high accuracy, reproducibility, and secrecy. The Black Hat may have access to an image of the unclonable object 630, and may even have the exact PUF image 602 needed to authenticate the transaction, but without the exact location 603 he should not be able to extract PUF responses 606. The entropy, or number of possible configurations, is high enough to reduce, if not eliminate, the chances for the Black Hat to extract the correct responses. The authentication module 614 may limit the number of negative attempts to a very small number, such as three attempts, so statistically the set of methods described here can prevent malicious authentications by keeping the knowledge of the location 603 secret. The CRP matching is done using the data stream 642 portion of the PUF challenge 604 and the PUF response 606 derived from the location 603. In one embodiment, if the number of bits defining the "location" 640 is m, the number of possible configurations is $E=2^m$. For example, if $m=32$, $E=2^{32}=4\times10^9$, which is quite high. By comparison, the commonly used 4 digit pin code has a low number of possible configurations, $E=10^4$.

Figure 7:
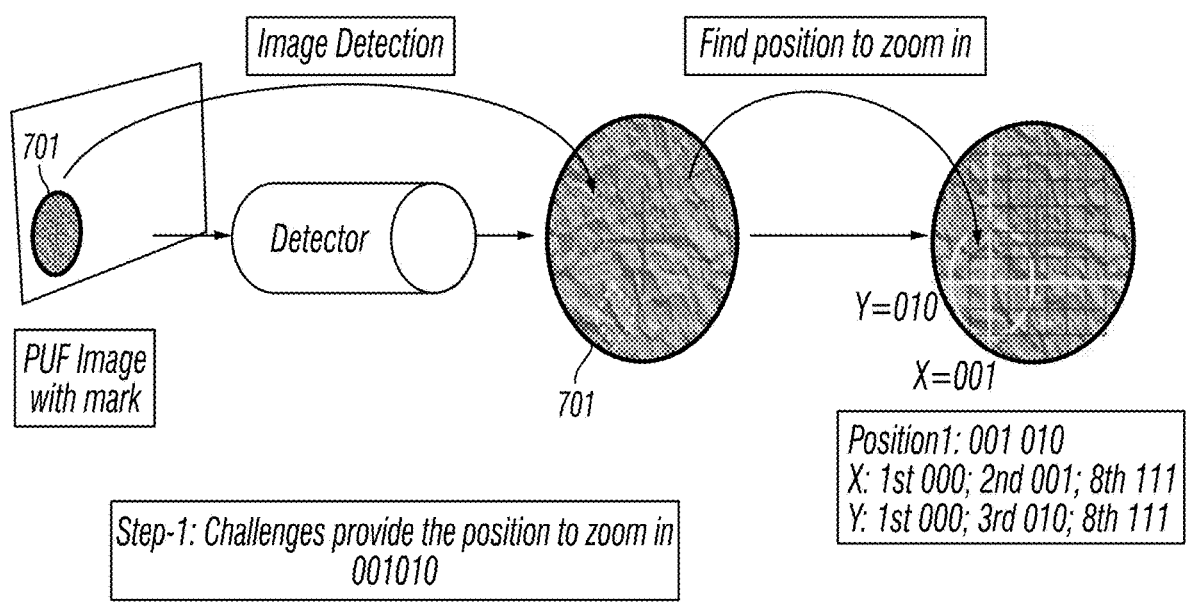
FIG. 7 is a diagram illustrating a process of marking an image to locate the authentication information, in accordance with the present disclosure.

Thus, the "location" 640 essentially locates the PUF response 606 in the PUF image 602. Several examples of locating the PUF response 606 are described herein and are not limiting. FIGS. 7-10 illustrate one exemplary method. At the outset, it is important to start the image recognition process on a solid ground. The unclonable object may have a clear marking system, such as a superimposed cross 701, as shown in FIG. 7, or another marker. The marker may be used as a reference or origin from which to start locating the response.

Figure 8:
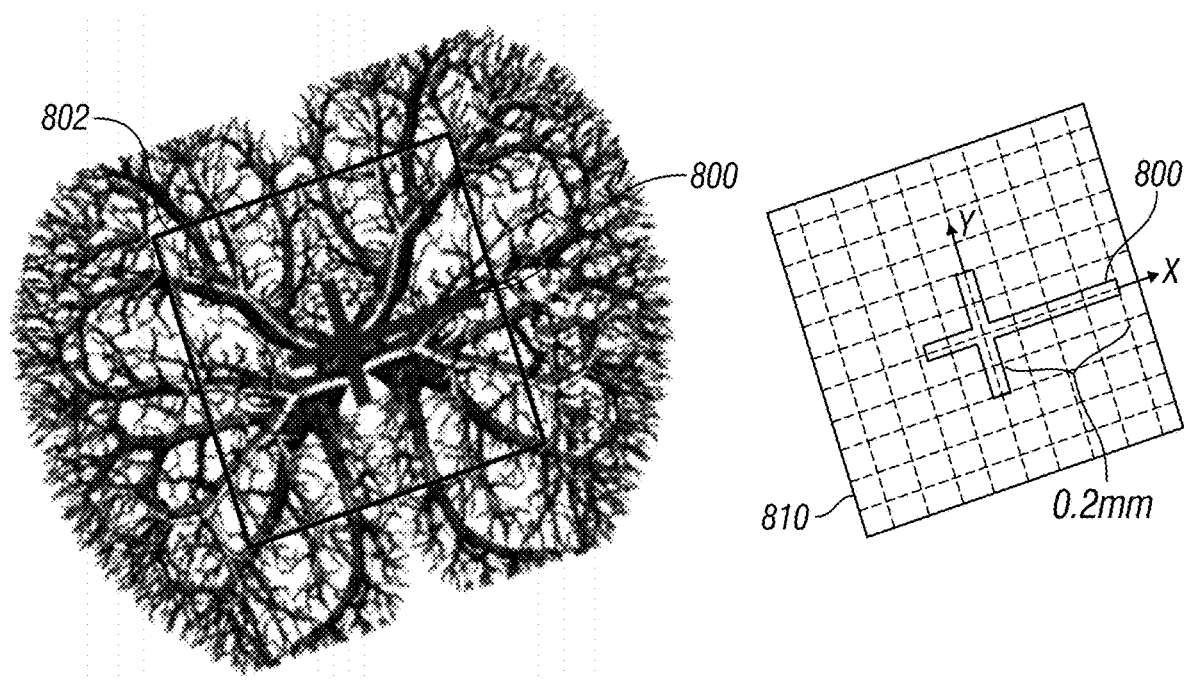
FIG. 8 is a diagram illustrating an exemplary unclonable image with a marker.

Referring to FIG. 8, the marker 800 (e.g., cross 701 of FIG. 7) may also be used to aid in image 802 alignment. Without proper image alignment, the PUF challenge will guide the authentication module to the wrong location in the PUF image and the matching algorithm will yield a high false rejection. Since all locations in the 2-dimensional space are defined with respect to the center point of the image 802, the marker 800 may be used to set the reference point, the orientations of the horizontal and vertical axes, and the scale of the image. In order to align the captured image 802 with the reference set of parameters, as many as three consecutive transformations may be needed—"shifting," "rotation," and "scaling"—to obtain the PUF image 802 and eliminate any artifacts caused by the imaging device (e.g., light intensity, camera orientation, magnification rate). Suitable approaches to performing these transformations include, without limitation: printing the reference marker on the un-clonable device in the production phase, such that a marker 800 with a predefined shape (e.g. a cross), orientation, size and color appears overlaid on top of the unclonable image 802; marking three points on the device in given locations to define the origin, the orientations of horizontal and vertical axes, and the scale of the image; and, extracting specific reference points from the figure based on a desired criterion. In one embodiment of extracting reference points, the system may select both the largest dark spot and the largest light spot in the image, and may use these two points to draw X and Y axis to "locate" the reference. Likewise, the system may choose the longest and/or the shortest branch in the image as a reference marker 800, and may choose its center and direction as the origin and the x-axis in the Cartesian coordinate system 810. The advantage of this method is that no additional marker print is required in the production phase.

Figure 9:
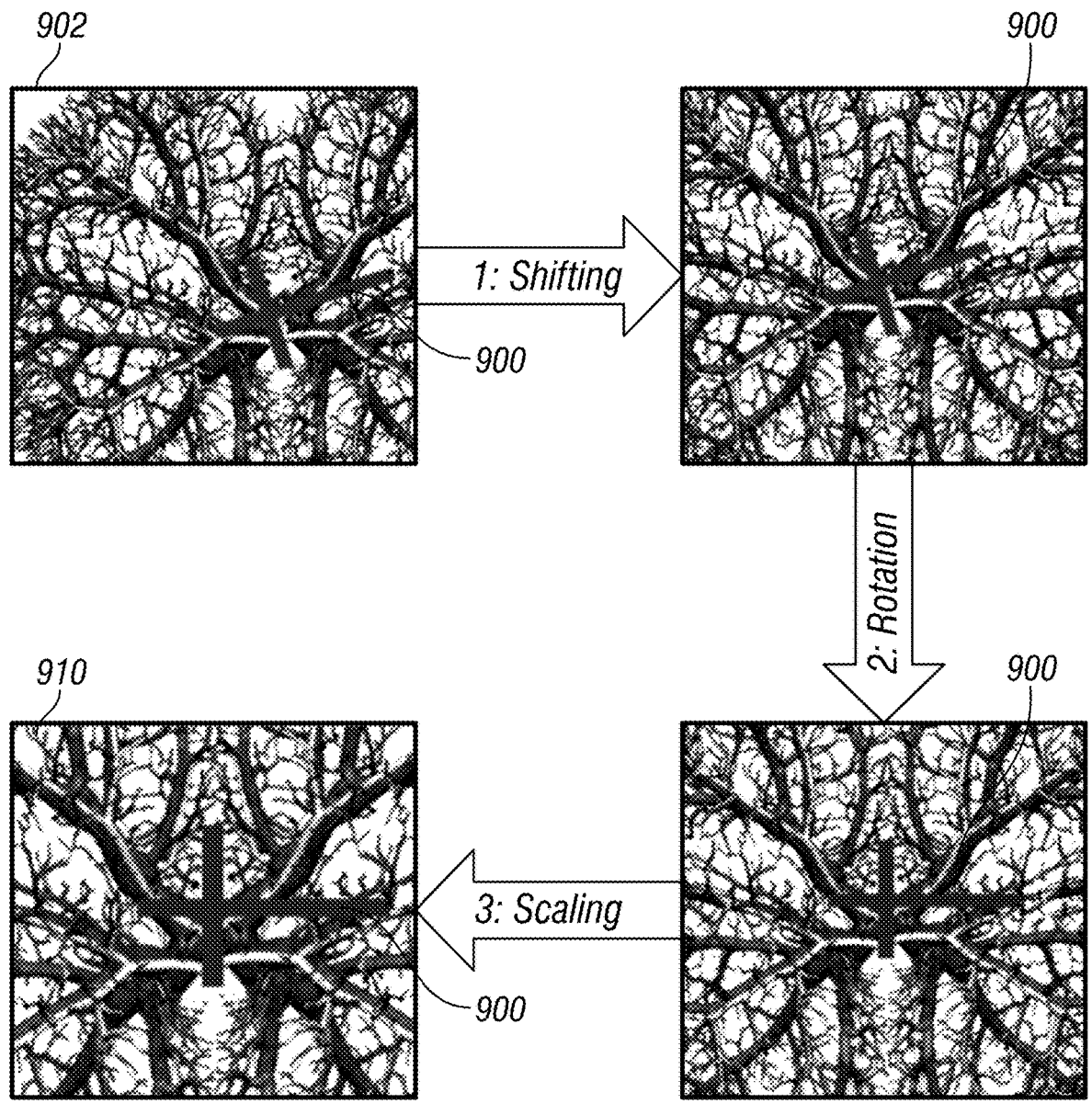
FIG. 9 is a diagram illustrating consecutive operations to align a PUF image with a reference model.

Referring to FIG. 9, regardless of the abovementioned options to define a reference coordinate system, the following steps may be applied to align the image into the correct orientation. The described example presumes that the marker 900 is a red cross printed on the center of the device, such that its center defines the reference point of the image 902 and the longest side aligns with the positive X direction. The length of the sides provides the scale of the image (e.g., the longest side is 0.2 mm, see FIG. 8). In order to implement this method, a square digitized greyscale digital image may be represented by a n×n matrix X (likewise, colored images such as RGB images can be represented by three matrices $X_r$, $X_g$, $X_b$), where $n^2$ is the number of pixels.

In order to find the marker 900 in the image, the system may apply a segmentation algorithm based on clustering the pixels into two disjoint segments in order to extract the pixels corresponding to the cross. Information regarding the color of the marker (e.g. RGB values of the red color in the example) may be used to initialize the clustering algorithm based on hard thresholding. Then, the system may execute one or more clustering algorithms, such as k-means and EM-with-distance-measure, to capture both texture/color and the Euclidean distances among the cluster members. For instance, the distance between nodes $A(x_A, y_A)$ and $B(x_B, y_B)$ with RGB color vectors $(r_A, g_A, b_A)$ and $(r_B, g_B, b_B)$ may be defined as:

$$d_{AB} = \alpha \sqrt{(x_A-x_B)^2+(y_A-y_B)^2} + (1-\alpha)\sqrt{(r_A-r_B)^2+(g_A-g_B)^2+(b_A-b_B)^2}$$

where $0 \leq \alpha \leq 1$ is a parameter to balance between the texture and contiguity of the clusters. A first cluster is corresponding to the marker 900 and the second cluster corresponds to the rest of the image 902. The locations corresponding to the first cluster are retained in a set denoted by $C_1$.

The system may shift the image 902 so that the center of the marker 900 coincides with the center of the image 902. If the center of the marker 900 is in $[a, b]^T$ position with respect to the center of the image 902, the image 902 may be shifted with vector $[-\alpha, -\beta]^T$. In some embodiments, the system may shift the image 902 using the operation $S_{a,b}(\cdot)$, where $\alpha$ and $\beta$ are the shift in x and y directions: for any point P $(x_P, y_P)$, $S_{a,b}(P)=[x_P-\alpha, y_P-b]^T$.

In order to align the image 902 in a correct orientation, the system may use rotation operator $R_\theta(\cdot)$ that rotates the image 902 $\theta$ degrees counterclockwise. Therefore the point $P(x_P, y_P)$ is mapped to $$R_\theta(P) = \begin{bmatrix} \cos\theta & -\sin\theta \\ \sin\theta & \cos\theta \end{bmatrix} \begin{bmatrix} x_P \\ y_P \end{bmatrix}.$$

The system may scale the image in order to compensate for a potentially unadjusted magnification of the imaging device upon capture of the image 902. In this regard, the system may apply operator $\Psi_{pq}(\cdot)$, where p and q are prime integers and the operator $\Psi_{pq}(\cdot)$ scales the image with ratio p/q. The system may first upscale the image with rate p using interpolation methods such as nearest neighbor, bilinear, bicubic, spline, sinc, and lanczo; then, the system may downsample the image with rate q. For high quality images, the ratio is below one and no interpolations are needed.

Figure 10:
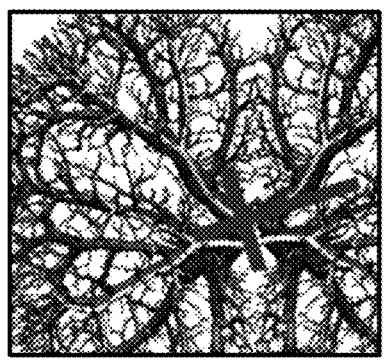
FIG. 10 is a diagram illustrating an exemplary process of finding optimal transformation parameters to align the extracted marker with the reference marker.
Figure 10:
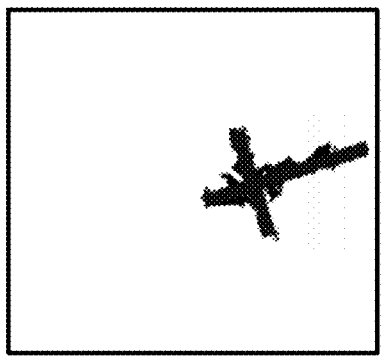
Figure 10:
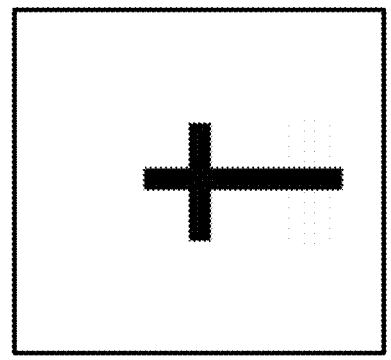

In order to find the optimal rotation and scale parameters, the system may make a copy of the image 902 and replace the pixels in the second cluster with white pixels; the resulting matrix is referred to as $X^{(w)}$. Then the system may obtain the optimal parameters that provide the best match between the transformed $X^{(w)}$ and the reference marker denoted by $X^{(R)}$ by solving the following optimization problem:

$$\theta^{(opt)}, p^{(opt)}, q^{(out)} = \mathrm{argmin} \, |\Psi_{pq}(R_\theta(X^{(w)})) - X^{(R)}|_2^2$$

where $|X|_2^2$ is the second norm of matrix X. This operation for a greyscale image is shown in FIG. 10. Upon identification of the optimal operator parameters, the system may transform the original image 902 into a transformed image 910, which is used in the subsequent authentication stage.

Figure 11:
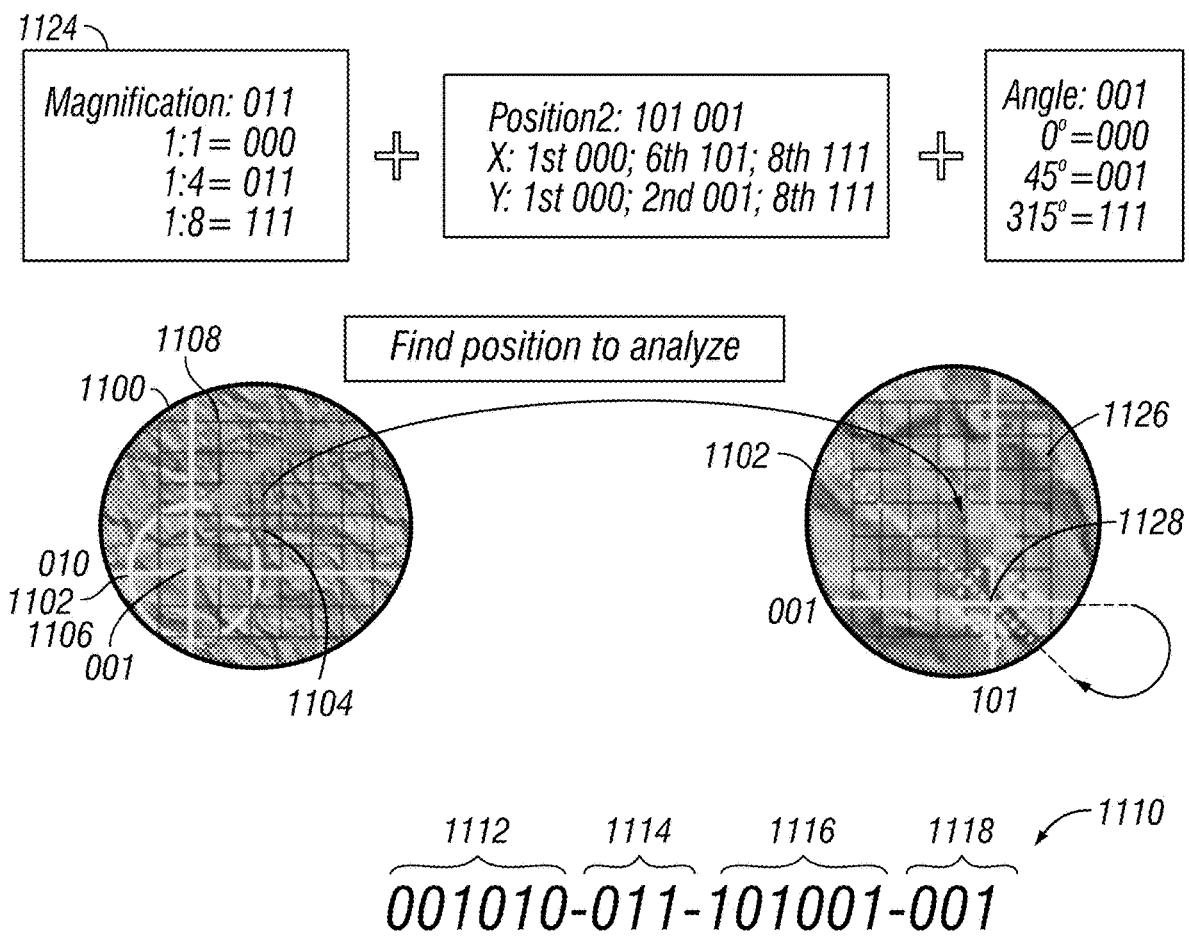
FIG. 11 is a diagram illustrating an exemplary process of locating a sub-region of a PUF image containing the authentication information.

Using the transformed image 910, the system may localize a sub-region of the image 910 that is used in the authentication process. FIG. 11 illustrates an example in which a sub-region 1102 of a transformed PUF image 1100 may be determined by the first 18 bits of the PUF challenge 1110 (i.e., the bits of the "location" 640 of FIG. 6). The first six bits 1112 of the PUF challenge 1110 provide the location 1106 in the image 1100 of where to localize the sub-region 1102. In some embodiments, a standard grid 1108 of eight positions for the X-axis by eight positions for the Y-axis, centered on the center 1104 of the image 1100 is used to find the location 1106. In the example described in FIGS. 7 and 11, the zoom-in location is at X=2 (two over eight is described by 001 base 2), and Y=3 (010 base 2).

The system may then read additional bits in the PUF challenge 1110 to determine and apply a magnification at the center of the sub-region 1102 (i.e., at the location 1106). In some embodiments, the next three bits 1114 of the PUF challenge 1110 may identify a magnification ratio. In some embodiments, each potential value of the three bits 1114 may be associated with a magnification ratio (e.g., in a lookup table 1124 as shown in FIG. 11). In the example, the system can magnify the image up to 8 times, and the instruction is to use a 1:4 magnification (the number 4 is 011 base 2). After applying the magnification, the system may determine a second location containing information to be extracted for the PUF response. For the positioning within the magnified area (i.e., the sub-region 1102), an 8×8 grid 1126 may again be used. The next group of (e.g., six) bits 1116 of the PUF challenge may determine the position 1128 of the second location with respect to the center of the magnified sub-region 1102. In the example, the position X=6, and Y=2 is selected, as described by 101001. To further obscure the sub-region 1102 containing the authentication data, the PUF challenge may include bits 1118 (e.g., the next three bits) that identify a rotation angle. Then the instruction is to rotate the sub-region 1102 around the second location by the rotation angle; on an exemplary 1-8 scale from zero to 315 degrees, 45 degrees is the second possible position, or 001 (see example). In other embodiments, the interval between potential rotation angles may be so large than only two bits are needed to represent the possible positions, while in other embodiments the interval may be so small that four, five, six, or more bits are needed to represent the possible positions (e.g., at an interval of 6.125 degrees, six bits are needed to represent the 64 possible rotation angles).

Figure 12:
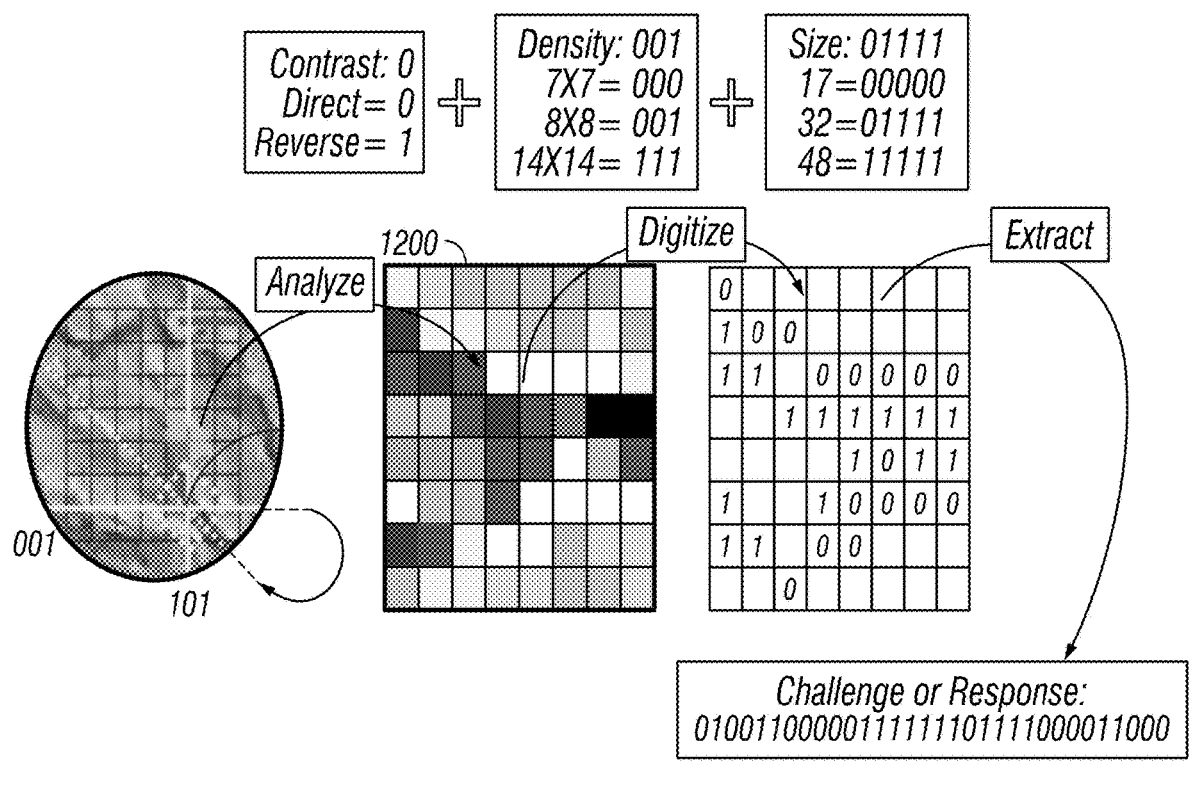
FIG. 12 is a diagram illustrating an exemplary process of generating a PUF challenge or a PUF response from pixel data in a sub-region of the PUF image.

Referring to FIG. 12, the 8-by-8 grid now defines the sub-region 1200 (e.g., of pixels) that contains the authentication information. The system calculates the challenge response based on the selected image sub-region 1200. In one calculation method, called the binary response method, once the sub-region 1200 is determined the PUF challenge brings an additional 9 bits (i.e., from the location data stream 640 of FIG. 6), and the system uses the bits to generate the response data stream. The first bit instructs the system to pick a direct or reverse, or positive or negative, contrast polarity; in some embodiments, a 0 will keep a positive contrast while a 1 will reverse the contrast, and it is a 0 in this example. Then, based the level of contrast in the sub-region 1200 (or in the image as a whole), the image (or the sub-region 1200 of the image) is converted into a chessboard tracking the gradient of light intensity. That is, the darkest spots are converted into black squares, the lightest spots into white squares, and the rest have a varying level of gray in between. In some embodiments, the next three bits determine the number of positions at which the contrast should be sampled, referred to as the "density" of the chessboard. In this example, the density could be a grid varying in size from 7×7 to 14×14 (the instruction given is 8×8, this is the second possible density, a 001). The next group of (e.g., five) bits may determine the size of the PUF response. In the example, the size could vary from a minimum of 17 bits to a maximum of 48, the instruction is to pick 32 which corresponds to the $16^{th}$ position, or 01111.

Figure 13:
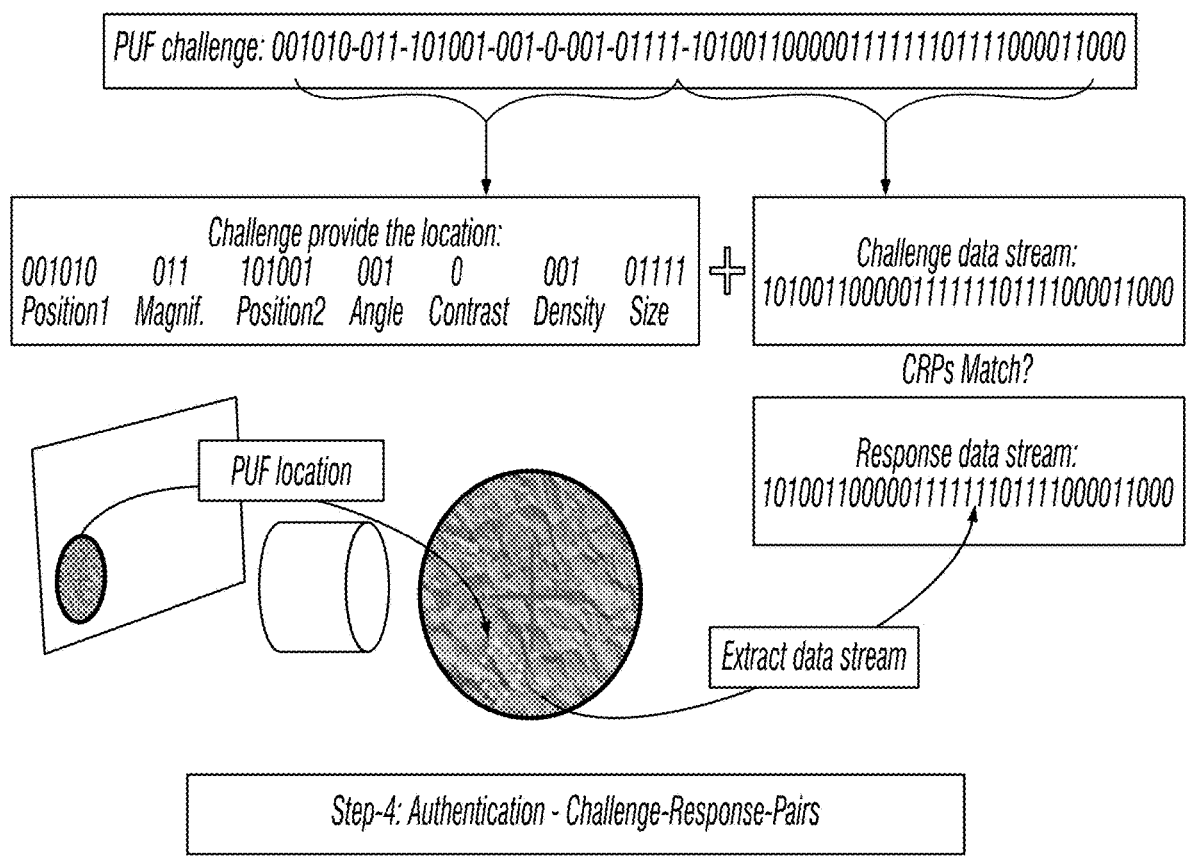
FIG. 13 is a diagram illustrating an exemplary process of using CRPs to authenticate the image.

With the location totally defined, the remaining task is to convert the physical parameters, i.e. gradient of gray of the squares of the chessboards, into a PUF data stream, which may be either challenges or responses. In the illustrated example of selecting which 32 squares in the 8×8 grid should populate the PUF data stream, the 16 lightest squares are selected and converted into 0's, and the 16 darkest squares are selected and converted into 1's. The resulting 32 bits are then added to the PUF data stream sequentially from top to bottom and from left to right of the grid: 01001100000111111101111000011000. As summarized in FIG. 13, at this step the information given by the "location" portion of the PUF challenge is allowing the authentication module to precisely find where and how to extract the data stream usable for CRP matching. The "location" portion of the challenges in this particular example contains 27 bits, or $2^{27}=1.3 \ 10^8$ possible configurations, while the data stream piece of the challenges, and the response contains 32 bits, or $2^{32}=4 \ 10^9$. To be clear, during challenge generation two data streams are generated, the 27 bits to give the "location", and 32 bits that represents the randomness of the PUF. During response generation, the 27 bits of the challenge provide instructions on the "location" to realize the randomness, while only 32 bits are freshly generated. The CRP matching only takes the random 32 bits of both the challenges, and responses. The authentication is positive only if the CRP error rate is small enough. A match result means that the unclonable image brought by the client creates a response which is almost identical to the challenge obtained from the secure server.

Figure 14:
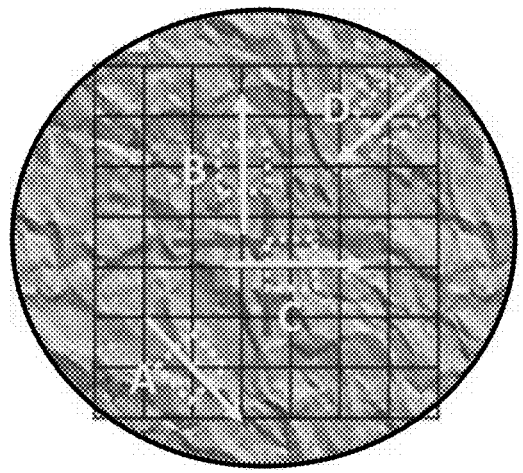
FIG. 14 is a diagram illustrating an exemplary process of calculating the sub-region of the PUF image using multiple locations, in accordance with the disclosure.

Referring to FIG. 14, in another calculation method, called the multiple locations model, multiple portions of the image may be selected by reading the "location" portion of the challenges. Each selected portion may have a different orientation. Considering that nine bits may be used to define the position and angle of each portion, a total of 36 bits of the PUF challenge are needed to "locate" the total area, comprising four portions, that contains the authentication information; this represents $2^{36}=7\times10$ possible configurations. The random portion of both the challenges and the responses is 8×4=32. If necessary it is possible to increase the length of the data stream describing the "location" by adding to the 36 bits some instructions such as contrast, density of the chessboards, and number of reference bits per area.

Another calculation method, called multi-level projection, is proposed to calculate the response message based on the challenge received using the preprocessed captured image. This method can be implemented as an extra option for more secure authentication based on the application requirement. It also can be performed in sequence after the first level of authentication is passed successfully. The second difference of this method is that despite the "binary response method", the system can consider the specific structure and properties of certain unclonable objects produced with nanomaterials.

Figure 15:
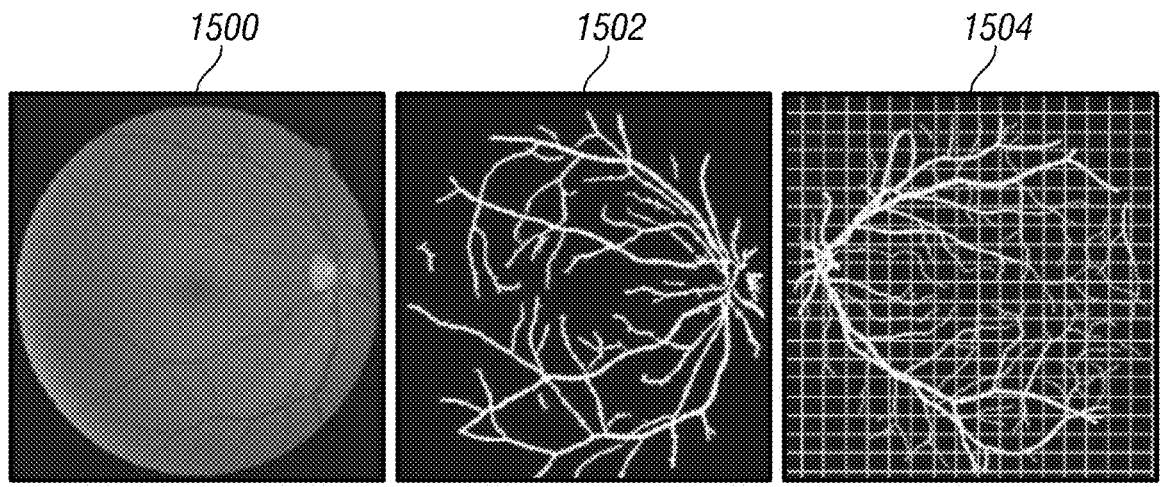
FIG. 15 is a diagram illustrating an exemplary process of converting the captured image to a monochrome image by extracting the vessel pattern from the background image.

In one example, due to high similarity between the patterns generated by certain unclonable objects with vasculature detection in biomedical imaging, the system can apply a segmentation algorithm that incorporates some or all of: i) thresholding methods, ii) tracking and region growing, iii) gradient-based geometry methods, and iv) learning-based methods. Referring to FIG. 15, the system may use the segmentation algorithm to extract a tree-structured dendrite pattern 1502 from the background noise of a biological image 1500. In particular, applying the automated segmentation algorithm converts the preprocessed image into a monochrome image separating the foreground pattern from the background. By splitting the image into pixels as shown by yellow grids 1504, each pixel includes a white-colored pattern printed on a black background.

Figure 16:
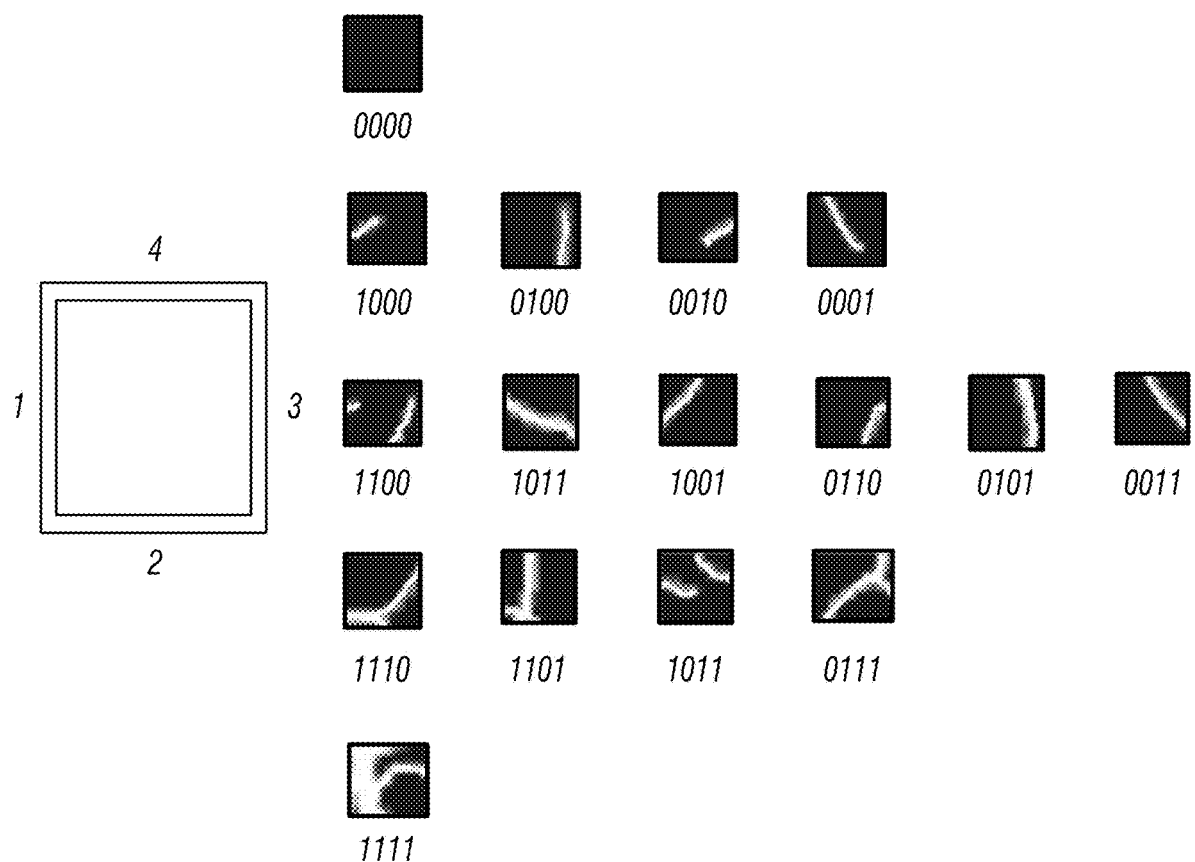
FIG. 16 is a diagram of exemplary skeleton patterns for the pixels of the monochrome image of FIG. 15.

In order to convert the patterns into numbers, the system can use one of the following methods. First, convert the patterns into tree shaped lines by extracting the center lines. Then, map the extracted skeleton to a 4-digit number (0 to 15). Then, assign numbers [1 to 4] to each side of a square-shaped pixel. If the skeleton of the pattern meets a side, assign digit "1" to the corresponding location. For instance, if the pattern meets sides "1" and "3", the assigned number becomes 10(decimal)=1010(binary). An empty pixel is mapped to 0(decimal)=0000(binary) and a heavily printed pixel is mapped to 15(decimal)=1111(binary). A full list of situations with sample pixels extracted from the vessel image is depicted in FIG. 16.

Based on the region size defined above, each region includes 8×8=64 pixels and since each pixel is mapped into 4 bits, the whole region can be specified with a binary vector of length 64×4=256 bits, denoted by P. The response message is longer compared to the binary response mode. In order to limit the size of response message and also to incorporate more security, transform the obtained 256-bit binary vector P to a 32-bit binary vector Q using random projection. To do so, generate a sparse and irregular binary matrix of size 32×256 denoted by G. Then, obtain the response vector Q through multiplying generator matrix G by the original vector P (i.e., Q=G×P), where P and Q are column vectors. It is notable that in order to make the system more unobvious and secure, the system may generate multiple versions of generator matrix and include the identity of matrix in the challenge message. For instance, using 128 different generator matrices, the system can specify the matrix with an additional 7 bits in the challenge message.

The methods presented in this disclosure are based on the generation of challenges that contain the instructions necessary to find the "location" within the unclonable object where challenges and responses random data steam shall be generated. If the more complicated multi-level projection mode is used, the challenge message also includes the generator matrix identifier. Thereby, the full data stream of the challenges shall include both the data stream describing "location", and the data stream of random numbers that are used during subsequent authentication cycles to be compared with the data stream generated during the response cycles. The longer the data stream describing the "location", the higher the entropy and the secrecy of the responses will be. The length of the stream of random numbers of both challenges and responses can also increase or decrease the strength of the resulting PUFs by increasing or reducing entropy in the system. The embodiments of these sets of methods shall all share a similar architecture for the composition of the challenge, with a portion being dedicated to "positioning", and the balance to contain the PUF random information.

Additional considerations of the presently described systems and methods are as follows:

1) The system uses PUF challenges that incorporate two binary data streams, the first one for defining the "location" on the unclonable object where physical parameters will be used to generate the second data stream. During the setup of the authentication system, both data streams are stored in a secure server. During authentication cycles the responses, which contain only one data stream, are generated on the "locations" defined by the first data streams provided by the challenges. If the second data stream of the challenge is close enough to the data stream of the response, the challenge-response-pairs (CRP) are mainly identical, and the authentication positive. If the CRPs do not match the authentication is negative.
2) In some embodiments, the two data streams of the PUF challenge may not be organized in a serial way, i.e. the first data stream ahead of the second data stream, and are rather mixed with each other in a pre-defined fashion, in order to confuse a potential hacker.
3) A marker is inserted in the unclonable object to be used to precisely define the "locations" that will generate the second data stream, or the data stream of the responses.
4) In other embodiments the marker is replaced by a different way to recognize the spatial position of the unclonable object.
5) The "location" to define where to generate the second data stream, or the data stream of the responses, can include the X, Y coordinates that define the position of the area to analyze within the unclonable object, using the marker or other reference.
6) The "location" to define where to generate the second data stream, or the data stream of the responses, can include angle of the orientation of the area to analyze within the unclonable object, using the marker or other reference.
7) The "location" to define where to generate the second data stream, or the data stream of the responses, can include the magnification 1: X to expand the area that will be analyzed within the unclonable object, using the marker or other reference.
8) The "location" to define where to generate the second data stream, or the data stream of the responses, can include the X, Y coordinates that define the position of the area to analyze within the area that was magnified.
9) The "location" to define where to generate the second data stream, or the data stream of the responses, can identify the polarity of the contrast as positive (i.e., unchanged) or negative (i.e., reversed).
10) The final area that is used to generate the second data stream, or the data stream of the responses, is converted into an electronic chessboard where each square has a gradient of gray reflecting the level of contrast of the image of the unclonable object. The areas with the darkest contrast become black squares, the area with the lightest contrast become white squares. The areas in between have a gradient of gray proportional to the contrast.
11) The size of the chessboard is defined as one additional parameter of the "location."
12) The number of bits of the second data streams is defined as a parameter of the "location."
13) The "location" to define where to generate the second data stream, or the data stream of the responses, can include the description of multiple positions of areas to analyze within the unclonable object, using the marker or other reference.
14) The methods can be used to secure financial transactions.
15) The methods can be used to secure fiber-optic communication.
16) The methods can be used to enhance trustworthiness of access control.
17) The methods can be used to enhance biometry, including securing finger print based authentication, face recognition, hand recognition, and other image detection based methods.
18) The method of authentications including "binary response method" and "multi-level projection method" is specified by a single message in the challenge message.
19) The generator matrix ID is specified with seven bits in the challenge message if multi-level projection method is used.
20) The method of converting the pixels into numbers proposed in multi-level projection method captures the fundamental properties of the unclonable objects in a unique way.

This disclosure is intended to explain how to fashion and use various embodiments in accordance with the invention rather than to limit the true, intended, and fair scope and spirit thereof. In one aspect, the present disclosure provides a method of authenticating a transaction. The method includes: receiving an image of a physically unclonable object presented to authenticate the transaction; obtaining, from a secure server, a challenge generated using a physically unclonable function representing the object, the challenge comprising a first binary data stream and a second binary data stream; using the first binary data stream to determine a plurality of values each associated with a corresponding extraction parameter of a plurality of extraction parameters together describing a sub-region of the image; transforming, using the extraction parameters, image data associated with the sub-region of the image to produce a third binary data stream representing a response to the challenge; determining that the third binary data stream matches the second binary data stream within a threshold degree of confidence; and, authenticating the transaction.

Using the first binary data stream to identify the sub-region may include: determining, from a first group of bits in the first binary data stream, a first location in the image; determining, from a second group of bits in the first binary data stream, a magnification ratio; performing a magnification of the image according to the magnification ratio, the magnification being centered on the first location; determining, from a third group of bits in the first binary data stream, a second location in the image, the second location located with respect to the first location; determining, from a fourth group of bits in the first binary data stream, a rotation angle; performing a rotation of the image around the second location by the rotation angle; and, determining as the sub-region a grid of positions containing the image data at the position, magnification, and rotation identified in the first binary data stream.

Using the first binary data stream to identify the extraction parameters may include: determining, from a first group of bits in the first binary data stream, a contrast polarity; determining, from a second group of bits in the first binary data stream, a density representing a number of positions to be sampled in the image data; and determining, from a third group of bits in the first binary data stream, a first number of bits representing a size of the response. Extracting the response may include applying the contrast polarity to the image data to produce contrasted image data, transforming the contrasted image data into gradient image data that is divided into a grid of the positions and represents the sub-region according to the density, determining a binary representation of a first plurality of the positions and a second plurality of the positions, a total number of the positions in the first plurality and the second plurality of positions being equal to the size of the response, and generating the third binary data stream from the binary representation. Determining the binary representation may include assigning a zero to a first plurality of the positions and assigning a one to a second plurality of the positions, the gradient image data comprising a corresponding grey value for each of the positions, the first plurality of the positions each having a darker corresponding grey value than each of the second plurality of positions; generating the third binary data stream may include converting the binary representation from a grid arrangement to a linear arrangement.

In another aspect, the present disclosure provides an authentication system for a computing environment. The authentication system includes one or more hardware computing devices in electronic communication with an imaging device and with a computer server, the one or more hardware computing devices configured to execute specific computer-executable instructions that upon execution cause the authentication system to: receive an electronic request to perform an action; receive from the imaging device an image of a physically unclonable object associated with the electronic request; obtain, from the computer server via an encrypted communication channel, electronic data representing a challenge associated with the object; determine, based on the electronic data, one or more extraction parameters for transforming a portion of the image to produce authentication data representing a response to the challenge; extract, using the one or more extraction parameters, the authentication data from the image; compare the authentication data to a portion of the electronic data to produce an authentication decision; and based on the authentication decision, allow or deny the electronic request.

Execution of the instructions may further cause the authentication system to, before extracting the authentication data, use a marker on the image to correct an alignment of the image; the system may then extract the authentication data using the marker. The one or more extraction parameters may include a first set of X,Y coordinates identifying, relative to the marker, a first location on which the portion of the image is centered.

The one or more extraction parameters may include: a first location used by the authentication system to locate the portion within the image; a magnification ratio used by the authentication system to transform image data of the image into magnified image data; and a second location within the portion and an angle, the second location and the angle used by the authentication system to rotate the magnified image data from a first orientation to a second orientation to produce rotated image data containing the authentication data. The one or more extraction parameters may further include: a contrast polarity used by the authentication system to transform the rotated image data within the portion into greyscale data; a density used by the authentication system to determine a number of positions and to divide the rotated image data within the portion into the number of positions; and a size used by the authentication system to select a subset of the positions as containing the authentication data.

To extract the authentication data from the image, execution of the instructions may causes the authentication system to: determine that the portion is centered at a first location within the image; magnify, at a magnification ratio, image data of the image to produce magnified image data; rotate, by an angle, the magnified image data to produce rotated image data; and extract the authentication data from the rotated image data within the portion. To extract the authentication data from the rotated image data within the portion, execution of the instructions may cause the authentication system to: identify image data of the image that lies within the portion of the image; divide the image data into a plurality of areas according to a grid; transform the image data into gradient data wherein each of the plurality of areas is assigned a corresponding contrast value based on color information of the image data within the area; and determine the authentication data from the gradient data.

The electronic data may include a first binary data stream and a second binary data stream. The first binary data stream and the second binary data stream may be arranged serially, or may be mixed in a pre-defined fashion. The action may be a financial transaction, and to allow the electronic request, the authentication system may send transaction information describing the financial transaction to the computer server. The action may be a transmission of data over a fiber-optic communication line, and to allow the electronic request, the authentication system may transmit the data over the fiber-optic communication line. The physically unclonable object may be a biometric object.

In another aspect, the present disclosure provides an authentication system including an imaging device a server storing a plurality of reference patterns associated with a physically unclonable object, and a computing device in electronic communication with the imaging device and with the computer server and storing specific computer-executable instructions that upon execution cause the computing device to: receive an electronic request to perform an action; receive from the imaging device an image of the physically unclonable object, the image associated with the electronic request; obtain from the server a first reference pattern of the plurality of reference patterns; determine, based on the physically unclonable object, one or more extraction parameters; extract, using the one or more extraction parameters, authentication data from the image; compare the authentication data to the first reference pattern to produce an authentication decision; and based on the authentication decision, allow or deny the electronic request.

The first reference pattern may be a multi-level projection. The first reference pattern may include a plurality of generator matrices including a correct generator matrix and one or more false generator matrices, and the computing device may determine, as one of the one or more extraction parameters, the correct generator matrix using one or more properties of the physically unclonable object.

The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of authenticating a transaction, the method comprising:
   receiving an image of a physically unclonable object presented to authenticate the transaction;
   obtaining, from a secure server, a challenge generated using a physically unclonable function (PUF) representing the object, the challenge comprising:
      a first binary data stream describing one or more locations in a PUF image that is aligned with a reference set of parameters, and one or more extraction transformations to apply at the one or more locations in order to identify a sub-region of the PUF image and extract authentication data contained in the sub-region; and
      a second binary data stream comprising the authentication data;
   applying one or more image alignment transformations to the image to align the image to the reference set of parameters, the one or more image alignment transformations including shifting, rotation, and scaling;
   using the first binary data stream to determine a corresponding value for each of one or more parameters of the one or more extraction transformations
   applying, based on the corresponding value of each of the one or more parameters, the one or more extraction transformations at the one or more locations in the image to identify the sub-region of the image;
   obtaining image data of the image from within the sub-region of the image;
   processing the image data to produce a third binary data stream representing a response to the challenge;
   determining that the third binary data stream matches the second binary data stream within a threshold degree of confidence; and
   authenticating the transaction.

2. The method of claim 1, wherein applying the one or more extraction transformations to identify the sub-region comprises:
   determining, from a first group of bits in the first binary data stream, a first location in the image;
   determining, from a second group of bits in the first binary data stream, a magnification ratio;
   performing a magnification of the image according to the magnification ratio, the magnification being centered on the first location;
   determining, from a third group of bits in the first binary data stream, a second location in the image, the second location located with respect to the first location;
   determining, from a fourth group of bits in the first binary data stream, a rotation angle;
   performing a rotation of the image around the second location by the rotation angle; and
   determining, as the sub-region, a grid of positions containing the image data at the position, magnification, and rotation identified in the first binary data stream.

3. The method of claim 1, wherein processing the image data to produce the third binary data stream comprises:
   determining, from a first group of bits in the first binary data stream, a contrast polarity;
   determining, from a second group of bits in the first binary data stream, a density representing a number of positions to be sampled in the image data; and
   determining, from a third group of bits in the first binary data stream, a first number of bits representing a size of the response.

4. The method of claim 3, wherein processing the image data to produce the third binary data stream further comprises:
   applying the contrast polarity to the image data to produce contrasted image data;
   transforming the contrasted image data into gradient image data that is divided into a grid of the positions and represents the sub-region according to the density;
   determining a binary representation of a first plurality of the positions and a second plurality of the positions, a total number of the positions in the first plurality and the second plurality of positions being equal to the size of the response; and
   generating the third binary data stream from the binary representation.

5. The method of claim 4, wherein:
   determining the binary representation comprises assigning a zero to a first plurality of the positions and assigning a one to a second plurality of the positions, the gradient image data comprising a corresponding grey value for each of the positions, the first plurality of the positions each having a darker corresponding grey value than each of the second plurality of positions; and
   generating the third binary data stream comprises converting the binary representation from a grid arrangement to a linear arrangement.

6. An authentication system for a computing environment, the authentication system comprising one or more hardware computing devices in electronic communication with an imaging device and with a computer server, the one or more hardware computing devices configured to execute specific computer-executable instructions that upon execution cause the authentication system to:
   receive an electronic request to perform an action;
   receive from the imaging device an image of a physically unclonable object associated with the electronic request;
   obtain, from the computer server via an encrypted communication channel, electronic data representing a challenge associated with the object and describing:
      an expected response generated by a physically unclonable function (PUF) associated with the object; and
      a plurality of extraction parameters for extracting the expected response from reference image data of an authentic image of the object, the reference image data depicting an unclonable physical attribute of the object;
   determine, based on the electronic data, corresponding values for the plurality of extraction parameters;
   using the corresponding values:
      identify a portion of the image that contains the authentication data;

apply one or more transformations to the image to produce a secret orientation of image data within the portion of the image; and extract authentication data from the image data in the secret orientation;

compare the authentication data to the expected response to produce an authentication decision; and based on the authentication decision, allow or deny the electronic request.

7. The authentication system of claim 6, wherein execution of the instructions further causes the authentication system to:

before extracting the authentication data, use a marker on the image to correct an alignment of the image; and extract the authentication data using the marker.

8. The authentication system of claim 7, wherein the one or more extraction parameters include a first set of X, Y coordinates, and to extract the authentication data using the marker, executing of the instructions causes the authentication system to:

identify, relative to the marker and using a first value of the corresponding values, a first location at the first set of X, Y coordinates in the image after the alignment of the image is corrected; and apply the one or more transformations to produce the secret orientation with the portion of the image centered on the first location.

9. The authentication system of claim 6, wherein the one or more extraction parameters include:

a first location used by the authentication system to locate the portion within the image;

a magnification ratio used by the authentication system, the one or more transformations including a magnification of the image data using the magnification ratio to produce magnified image data; and a second location within the portion and an angle, the second location and the angle used by the authentication system, the one or more transformations further including a rotation of the magnified image data from a first orientation to a second orientation to produce rotated image data in the secret orientation, the authentication system extracting containing the authentication data from the rotated image data within the portion of the image.

10. The authentication system of claim 9, wherein the one or more extraction parameters further include:

a contrast polarity used by the authentication system to transform the rotated image data within the portion into greyscale data;

a density used by the authentication system to determine a number of positions and to divide the rotated image data within the portion into the number of positions; and a size used by the authentication system to select a subset of the positions as containing the authentication data.

11. The authentication system of claim 9, wherein to extract the authentication data from the rotated image data within the portion, execution of the instructions causes the authentication system to:

divide the rotated image data into a plurality of areas according to a grid;

transform the rotated image data within the plurality of areas into gradient data wherein each of the plurality of areas is assigned a corresponding contrast value based on color information of the image data within the area; and determine the authentication data from the gradient data.

12. The authentication system of claim 6, wherein the electronic data comprises a first binary data stream containing the electronic data describing the plurality of extraction parameters, and a second binary data stream containing the electronic data describing the expected response.

13. The authentication system of claim 12, wherein the first binary data stream and the second binary data stream are arranged serially.

14. The authentication system of claim 12, wherein the first binary data stream and the second binary data stream are mixed in a pre-defined fashion.

15. The authentication system of claim 6, wherein the action is a financial transaction and to allow the electronic request, the authentication system sends transaction information describing the financial transaction to the computer server.

16. The authentication system of claim 6, wherein the action is a transmission of data over a fiber-optic communication line, and to allow the electronic request the authentication system transmits the data over the fiber-optic communication line.

17. The authentication system of claim 6, wherein the physically unclonable object is a biometric object.

18. An authentication system comprising:

an imaging device;

a server storing a plurality of reference patterns associated with a physically unclonable object and representing challenges for authenticating requests that are authenticated using the object; and a computing device in electronic communication with the imaging device and with the computer server, and storing specific computer-executable instructions that upon execution cause the computing device to:

receive an electronic request to perform an action;

receive from the imaging device an image of the physically unclonable object, the image associated with the electronic request;

obtain from the server a first reference pattern of the plurality of reference patterns;

determine, based on the physically unclonable object, one or more extraction parameters for extracting authentication data corresponding to the first reference pattern from reference image data of an authentic image of the object, the reference image data depicting an unclonable physical attribute of the object;

determine, using the one or more extraction parameters, a secret orientation of the image that enables extraction of the authentication data from the image;

apply one or more transformations to the image to reorient the image into the secret orientation;

extract, using the one or more extraction parameters, authentication data from image data of the image in the secret orientation;

compare the authentication data to the first reference pattern to produce an authentication decision; and based on the authentication decision, allow or deny the electronic request.

19. The authentication system of claim 18, wherein the first reference pattern is a multi-level projection.

20. The authentication system of claim 18, wherein the first reference pattern includes a plurality of generator matrices including a correct generator matrix and one or more false generator matrices, and the computing device determines, as one of the one or more extraction parameters, the correct generator matrix using one or more properties of the physically unclonable object.

\* \* \* \* \*